United States Patent [19]
Yokota

[11] Patent Number: 4,478,493
[45] Date of Patent: Oct. 23, 1984

[54] APPARATUS HAVING LIQUID CRYSTAL FINDER OPTICAL SYSTEM

[75] Inventor: Hideo Yokota, Kanagawa, Japan

[73] Assignee: Canon Kabushiki Kaisha, Tokyo, Japan

[21] Appl. No.: 364,208

[22] Filed: Apr. 1, 1982

[30] Foreign Application Priority Data

Apr. 20, 1981 [JP] Japan ................................. 56-60459
Jun. 10, 1981 [JP] Japan ................................. 56-88051

[51] Int. Cl.³ .................. G02F 1/13; G03B 13/20; G03B 13/14; G03B 13/10
[52] U.S. Cl. ................................. 350/336; 350/332; 354/164; 354/221; 354/222
[58] Field of Search .............. 350/332, 336; 354/25, 354/163, 164, 165, 166, 162, 221, 222

[56] References Cited
U.S. PATENT DOCUMENTS

3,534,672 10/1970 Ono ............................. 354/164
4,299,462 11/1981 Suzuki et al. ................. 350/336 X

FOREIGN PATENT DOCUMENTS

0226524 3/1963 Austria ........................... 354/222

*Primary Examiner*—John K. Corbin
*Assistant Examiner*—Richard F. Gallivan
*Attorney, Agent, or Firm*—Toren, McGeady and Stanger

[57] ABSTRACT

The disclosed apparatus includes a finder optical system with a liquid crystal display having a plurality of strips of transparent conductive material arranged to display a frame for photography and a light metering area in the field of view of the finder. The liquid crystal display is energized in selected or all areas depending upon which position the objective lens takes when focusing and when zooming, or upon the set value of focal length in an objective lens of zoom type, and upon the in-focus signal of an auto-focus camera. The parallax between the photographic framing of viewfield and the rangefinder view is corrected and the rangefinder spot is displayed in a corrected position.

6 Claims, 11 Drawing Figures (a)

(b)

(c)

APPARATUS HAVING LIQUID CRYSTAL FINDER OPTICAL SYSTEM

BACKGROUND OF THE INVENTION

1. Field of the Invention

This invention relates to apparatus having finder optical systems, and more particularly to apparatus having finder optical systems for exhibiting both focus and composition for a photographic lens, while the correction of parallax between the lens and the finder and the shift of a range finding area displayed by a liquid crystal unit.

2. Description of the Prior Art

In a conventional apparatus having a finder optical system arranged independently of a photographic optical system for still photography, 8 mm cinematography, VTR or the like, the photographic viewfield frame and the finder viewfield frame did not exactly coincide with each other, so that the so-called parallax is produced, and the rangefinder spot in the field of view of the finder is shifted. This results in disadvantages while shooting.

The correction of the parallax has been made in various ways. For example, the photographic camera which has a reverse-Galilean type finder optical system with a half mirror positioned in a space between the objective lens and eye-piece to display a frame for the lens in the field of view of the finder, or a so-called mark finder, makes use of a photographic field of a movable view frame plate arranged near the focal point of the eye-piece to effect correction of the parallax. This moving mechanism is generally complicated. Also in application to auto-focus cameras, the correction of parallax must be carried out mechanically in a short time, depending upon the focusing position of the objective lens, and, therefore, a mechanism for performing this tends to be complicated.

With a compact zoom lens-equipped camera having a finder optical system in isolation from the photographic optical system another problem arises. That is the parallax due to the difference between the locations of the objective lens and the finder increases rapidly in particular as the focal length and the object distance become short. This makes it more difficult for the photographer to compose his picture and focus the lens with high accuracy.

To correct the parallax, for example, an additional frame for use in focusing down to shorter object distance may be provided in the finder. Another method is to use a mask plate arranged in the finder to move in automatic response to change in the object distance. However, the former is much too simple to effect sufficient correction. The latter has the drawback that the control mechanism for the mask plate assumes a very complicated form. In addition thereto, as the frame changes its position to correct the parallax, range finding area is also shifted. It is, therefore, necessary to correct this shift of the range finding area.

An example of an apparatus having finder optical systems which have made correction of the parallax, appears in U.S. Pat. No. 3,534,672 and German Pat. No. 11 450 10.

SUMMARY OF THE INVENTION

It is an object of the present invention to provide an apparatus having a finder optical system with a liquid crystal display having a plurality of strips of transparent conductive material arranged in a portion of the optical system upon energization in selected areas to show a photographic viewfield frame and a range finding area, whereby it being made possible to perform correction of the parallax and correction of the shift of the range finding area quickly and with ease.

In application of the invention to, for example, an apparatus having a mark finder system, the aforesaid object is accomplished by causing selected areas of the liquid crystal display to appear as the objective lens moves.

Also in application to a zoom lens equipped with an independent finder a detecting mechanism for detecting the focal length position and/or the focusing position of the photographic optical system is made to cooperate with a control circuit for controlling energization of the liquid crystal display in selected area.

DETAILED DESCRIPTION OF THE PREFERRED EMBODIMENTS

Figure 1:
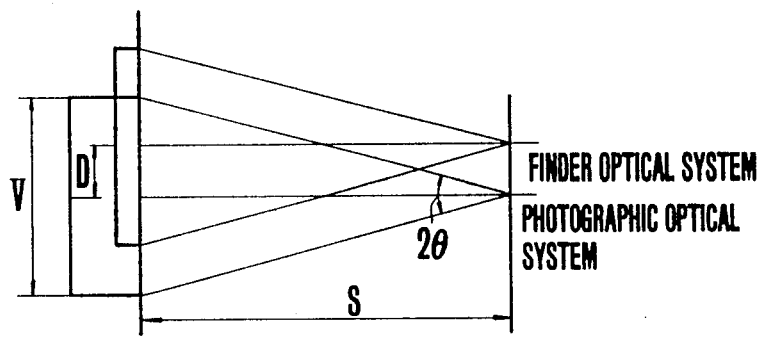
FIG. 1 is a diagram of geometry to explain the production of parallax.
Figure 2:
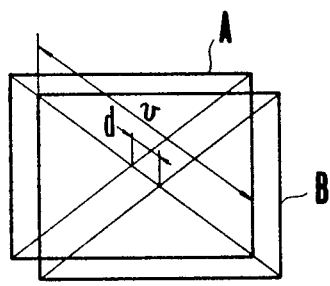
FIG. 2 is a plan view illustrating a difference in position of frames due to the parallax appearing in the field of view of the finder.

FIG. 1 illustrates the parallax of a finder optical system, the finder optical system being assumed to be located above and to the left of a photographic optical system as seen from the eye-piece side. Letting S denote the approximately equal distance between the entrance pupils of the photographic and finder optical systems and an object to be photographed, D the distance between the optical axes of both the optical systems, and $\theta$ the semiangular field of view of the photographic optical system in a direction connecting both the optical axes, the field of view V, of the photographic optical system is expressed by $V = 2 \tan\theta \times S$. Since, on the other hand, the optical axis separation D is always constant and the parallax R is defined by $R = D/V = D/(2 \tan \times S)$, the parallax R varies as a function of the focal length (dependent upon the $\theta$) of the photographic optical system and the object distance S. FIG. 2 illustrates a composition A of a scene to be photographed when focused at infinity as framed in the erected image plane near the field stop, and another composition B of the scene when focused down to shorter distances. Now letting d denote the distance between the centers of the areas of the frames A and B and v the size of the image of the view field V in the erected image plane, we have $d = v \times R$. Hence, if the framing is shifted at its center by the distance d, computed on the basis of the above formula, and the parallax will be corrected. Since, on the other hand, the range finding spot at the center in the field of view of the finder also changes its place simultaneously, this can be corrected in a manner similar to that described above.

Figure 3:
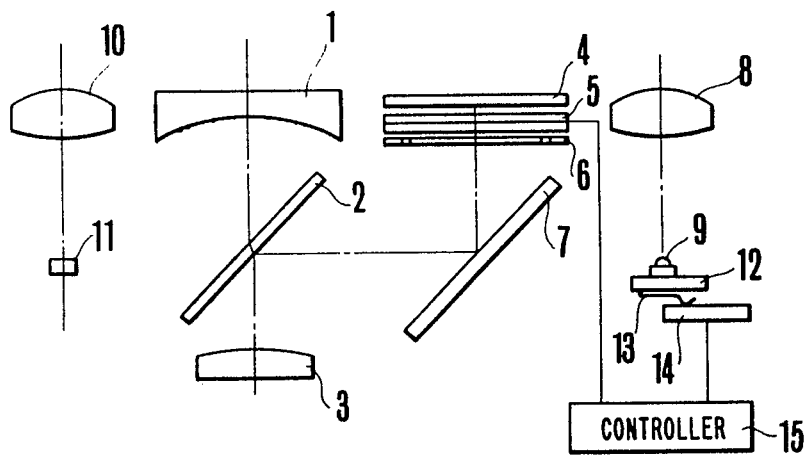
FIG. 3 is a schematic view of an embodiment of the present invention.

FIG. 3 illustrates an embodiment of the present invention applied to an auto-focus camera. In the drawing, 1 is an objective lens; 2 is a half mirror; 3 is an eyepiece; 4 is a diffusion plate; 5 is a liquid crystal display unit for framing the field of view for photography and indicating the area which the auto-focus device reads; 6 is a mask plate through which light coming from the selected areas of the liquid crystal display 5 passes; 7 is a total reflection mirror; 8 is a projection lens for auto-focus; 9 is a light emitting diode positioned near the focal point of the projection lens 8; 10 is a collection lens for auto-focus; 11 is a photo-sensitive element positioned near the focal point of the collection lens 10; 12 is a support plate for the light-emitting diode 9 arranged to move in a plane containing the axis of the projection lens 8 and the axis of the collection lens 10 in a direction almost perpendicular to the axis of the projection lens 8; 13 is a slider fixedly mounted on the support plate 12 and riding on a gray code plate 14 to detect the position of the light-emitting diode 9; and 15 is a controller responsive to signals from the gray code plate 14 for controlling the operation of the liquid crystal display unit 5.

The light-emitting diode 9 gives off light which is collimated and projected by the lens 8 on an object to be photographed, while the reflected light from the object is collected by the lens 10 on the photo-sensitive element 11. A peak of the output of the photo-sensitive element 11 is detected by moving the support plate 12, and the position of the support plate 12 is read by the slider 13 and the gray code plate 14 to find out the object distance. As the support plate 12 cooperates with a focusing control mechanism (not shown), a photographic objective lens (not shown) is set to the infocus position. Since the light-emitting diode 9 scans the target area, the slider 13 on the gray code plate 14 gives information representative of ever-changing object distances in discretely coded form, to the controller 15. The controller 15 responsive to such informations energizes the liquid crystal display unit 5 in selected areas, thus achieving correction of the parallax.

Figure 4:
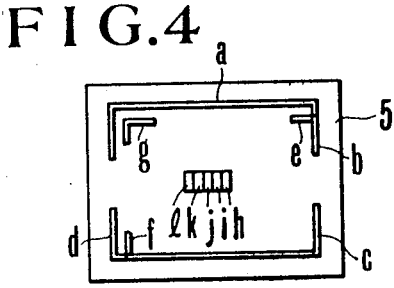
FIGS. 4 and 5 illustrate the details of portions of FIG. 3.

How a parallax-corrected frame is displayed in the field of view of the finder may be understood by reference to FIG. 4, wherein the liquid crystal display 5 of FIG. 3 is illustrated as comprising mutually-insulated strips, a to l, of transparent conductive material. Upon application of a potential gradient across the liquid crystal material to selected ones of the strips, a to l, a resultant photographic viewfield frame by the strips, a to g, along with a range finding spot by the strips, h to l, appears white on a black background.

As has been stated in connection with FIG. 3, when the auto-focus mechanism detects the fact that the object to be photographed lies at a far distance, the controller 15 selects the strips, a, b, c, d, h, i and j to be connected to a potential source, thereby these areas are rendered transparent to provide a photographic field of view for focusing on a distant object along with the corresponding rangefinder spot. Conversely when the object is found to lie in a shorter distance, the strips, b, c, f, g, e, j, h and l, are energized, so that these areas are rendered transparent, while the other areas are opaque.

Though this embodiment has been illustrated in connection with the division of the target area into two regions, or the far and near distance zones, it is to be understood that the present invention is not confined thereto and the target area may be divided to three or more zones with the corresponding displays. Thus, by changing between different displays of the frame and range-finder spot, it is made possible to correct the parallax of the frame and the shift of the rangefinder spot.

Figure 5:
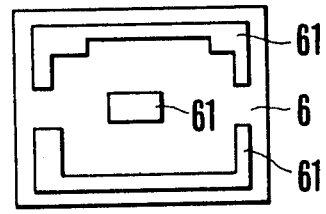

FIG. 5 illustrates the outline of the mask plate 6 of FIG. 3. This mask plate 6 has opening patches 61 alined with the strips, a to l, in the liquid crystal cell 5. The use of the mask plate 6 gives rise to an advantage that the reduction of contrast of the image in the areas of the photographic viewfield frame and rangefinder spot can be limited to a minimum.

Figure 6:
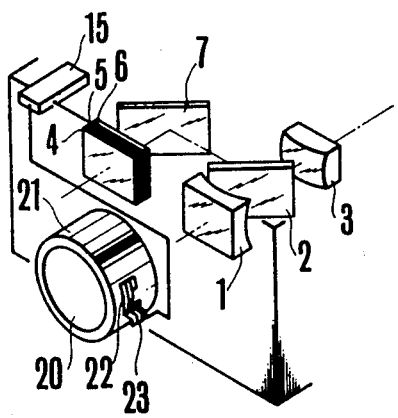
FIG. 6 is a schematic perspective view of another embodiment of the invention.

FIG. 6 illustrates another example of application of the invention to a camera having no auto-focus mechanism. In the drawing, the same reference characters have been employed to denote the similar parts to those shown in FIG. 3. In FIG. 6, 20 is an objective lens; 21 is a lens barrel; 22 is a gray code fixedly mounted on the outer surface of the lens barrel; 23 is a reader. The reader 23 on the gray code 22 measures the amount of forward movement of the objective lens 20 with the concurrent information being applied by the controller 15 to the liquid crystal cell 5. Thus, the display of the photographic viewfield frame and the rangefinder spot is controlled with the correction of the parallax between the finder and the lens in a similar manner to that described in connection with the embodiment of FIG. 3.

In this embodiment, the objective lens 20 is manually moved while the concurrent position of the objective lens 20 is sensed by the gray code 22 and the reader 23. It is at this point that this embodiment is different from the embodiment of FIG. 3.

Figure 7:
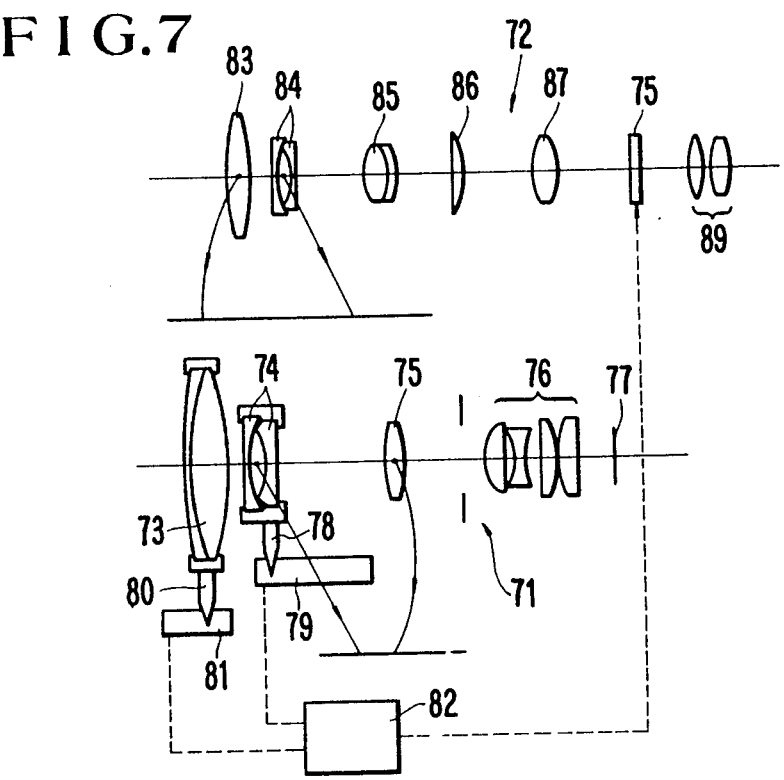
FIG. 7 is a schematic sectional view of an arrangement of a photographic optical system having a zoom lens and a finder optical system.
Figure 8:
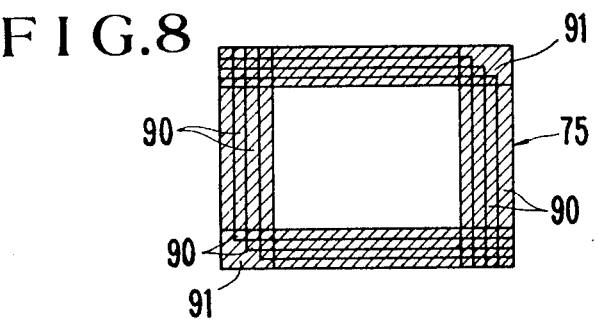
FIG. 8 is a plan view of a viewfield frame display of liquid crystal.

FIG. 7 is a lens block diagram of a photographic optical system 71 composed of a zoom lens and a finder optical system 72. The photographic optical system comprises, from front to rear, a focusing lens group 73 of positive power, a variator lens group 74 of negative power, a compensator lens group 75 of positive power and a relay lens group 76 of positive power followed by a film 77. The variator lens group 74 and the compensator lens group 75 are axially movable along rectilinear and curvilinear paths in directions indicated by arrows respectively. The position of the variator lens group 74 is sensed by a slider 78 on a resistance track plate 79. Also the position of the focusing lens member 73 is similarly sensed by a slider 80 on a resistance track 81. The outputs of these variable resistors 79 and 81 are applied to a control circuit 82 which in turn produces an output representing the focusing and focal length positions of the photographic optical system 71 based on the above-described formula. On the other hand, the finder optical system comprises, from front to rear, a positive lens group 83, a negative lens group 84, a positive relay lens 15, a field lens 86, an erector lens 87, a liquid crystal display unit 75 and an eye-piece 89. The lens groups 83 and 84 move along paths such as indicated by arrows in response to the zooming movement of the photographic optical system 71, so that thereby the magnification of the finder image is varied. The liquid crystal display unit 75 comprises a great number of mutually insulated strips of transparent electrically conductive material as illustrated by hatch lines in FIG. 8. For example, arranged in each of the upper, lower, left and right marginal zones of the field of view of the finder are four rectangular strips 90 in side-by-side relation to each other with four corner patches 91. The strips 90 and patches 91 may generically be referred to as "pieces". When these strips 90 and patches 91 are selectively energized across a liquid crystal material, the corresponding areas are colored, depending upon the output of the control circuit 82, thus providing a frame for the actual focal length of the lens 1. The energized strips and patches are identified by primes.

Figure 9:
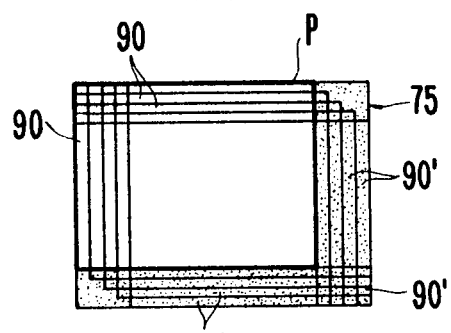
FIGS. 9(a) to 9(c) illustrate three different operative positions of the viewfield frame display.
Figure 9:
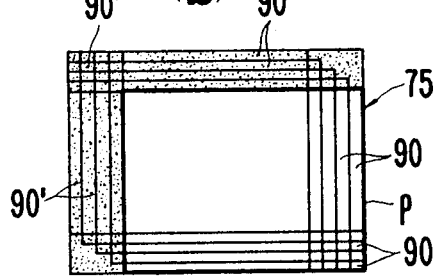
Figure 9:
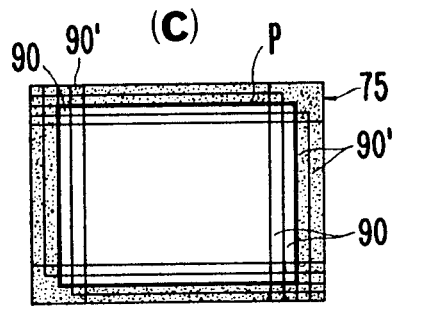

To shoot, it is in the finder optical system 2 that the lens groups 83, 84 and 85 forms an image of the object on the field lens 86, and this object image is re-focused by the erector lens 87 as an erected image which is observed through the liquid crystal cell 75 and the eyepiece 89. Then, while looking through the finder optical system 72, the photographer will operate the focusing and zooming rings on the outer barrel for the objective lens 71, thereby the adjusted focal length and the in-focus distance are detected through the variable resistors 79, 81 and 82 by the control circuit 12, thus coloring the liquid crystal display unit 75 in selected areas depending upon which ones of the strips 90 and patches 91 are energized by the signal from the control circuit 82. In more detail, FIG. 9(a) illustrates a viewfield frame of the objective lens 71 when focused on an infinitely distant object regardless of what focal length it has, as the lower and right marginal zones indicated by dots are colored to show a corrected composition lying in a upper left-hand area enclosed by a bold line block P. Also FIG. 9(b) illustrates a frame for the photographic optical system in the longest focal length position with the object at a short distance, and FIG. 9(c) illustrates an alternate frame for the photographic optical system 1 in the shortest focal length position. It is to be noted that the liquid crystal display unit can show two more frames between FIGS. 9(a) and 9(c) and between FIGS. 9(b) and 9(c), and is thus capable of presenting selective display of five different frames in total.

The embodiment has been described in connection with the photographic optical system 71 which has a varifocal function and with the finder optical system which also has a varifocal function, these two functions being correlated to each other. However it is to be understood that even when the photographic optical system 1 has no varifocal function, as the in-focus position of the photographic optical system 71 changes, the display of the frame and the range finder spot is changed to correct the parallax by controlling the operation of the liquid crystal display unit 75. The liquid crystal display unit 75 may be otherwise positioned at another focal plane in the finder optical system 2 to effect an equivalent result. Also the liquid crystal cell 5 is not always necessarily of such type and, for example, may be normally colored over the entire area thereof except the areas of the energized strips which become transparent.

As has been described in greater detail, the device for correcting the parallax between the photographic objective and the finder and the shift of the rangefinder spot according to the present invention is of very simple structure so that an electrically operated display in the form of a liquid crystal cell is arranged in one of the focal planes of the finder optical system. Therefore, there is utterly no need to use mechanical drive means in the finder optical system. This offers the advantage that the correction of the parallax and the rangefinder spot shift can be made quickly and accurately.

What is claimed is:

1. An apparatus having a finder optical system, comprising:
   a liquid crystal display unit;
   said liquid crystal display unit having a photographic viewfield frame and a range finding spot;
   said photographic viewfield frame and said range finding spot having a plurality of mutually insulated strips of transparent conductive material;
   drive means for driving said liquid crystal display unit and selectively actuating selected ones of the strips of said liquid crystal display unit with a drive signal; and
   the drive means forms said drive signal in response to changing of the focal length of a photographic objective lens.

2. An apparatus having a finder optical system, comprising:
   a liquid crystal display unit;
   said liquid crystal display unit having a photographic viewfield frame and a range finding spot;
   said photographic viewfield frame and said range finding spot having a plurality of mutually insulated strips of transparent conductive material;
   drive means for driving said liquid crystal display unit and selectively actuating selected ones of the strips of said liquid crystal display unit with a drive signal; and
   an autofocus device, said auto-focus device and said liquid crystal display unit being electrically connected with each other, and said drive means forms said drive signal on the basis of signals from said auto-focus device.

3. An apparatus having a finder optical system, comprising:
   a liquid crystal display unit;
   said liquid crystal display unit having a photographic viewfield frame and a range finding spot;
   said photographic viewfield frame and said range finding spot having a plurality of mutually insulated strips of transparent conductive material;
   drive means for driving said liquid crystal display unit and selectively actuating selected ones of the strips of said liquid crystal display unit with a drive signal; and
   a photographic optical system of variable focal length; and
   detecting means for detecting the focal length and/or in-focus positions of said photographic optical system; and
   said drive means forms said drive signal on the basis of the operation of said detecting means.

4. A photographic apparatus, comprising:
   (a) a photographic optical system;
   (b) a finder optical system independent of said photographic optical system;
   (c) display means for displaying at least one of a photographic viewfield frame and a range finding spot through said finder optical system;
   said display means having a plurality of liquid crystal pieces for changing the display of said display means; and
   (d) signal means for generating signals for selectively changing the state of said liquid crystal pieces in correspondence to a focal length of said photographic optical system.

5. A photographic apparatus according to claim 4, in which the photographic optical system is zoom lens.

6. A photographic apparatus, comprising:

(a) a photographic optical system;
(b) a finder optical system independent of said photographic optical system;
(c) display means for displaying at least one of a photographic viewfield frame and a range finding spot through said finder optical system,
said display means having a plurality of liquid crystal pieces for changing the display of said display means; and
(d) means for automatically focusing said photographic optical system; and
(e) signal means for generating signals for selectively changing the state of said liquid crystal pieces in correspondence to operations of said focusing means.

* * * * *